(12) United States Patent
Hansen et al.

(10) Patent No.: US 10,107,267 B2
(45) Date of Patent: Oct. 23, 2018

(54) METHOD FOR INSTALLATION OF A POWER CONTROL MODULE IN A WIND POWER UNIT TOWER AND AN AGGREGATE COMPONENT

(71) Applicant: Vestas Wind Systems A/S, Aarhus N. (DK)

(72) Inventors: Erland Falk Hansen, Morke (DK); Jacob Karottki Falk Andersen, Oslo (NO)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/128,499

(22) PCT Filed: Mar. 23, 2015

(86) PCT No.: PCT/DK2015/050060
§ 371 (c)(1),
(2) Date: Sep. 23, 2016

(87) PCT Pub. No.: WO2015/144178
PCT Pub. Date: Oct. 1, 2015

(65) Prior Publication Data
US 2017/0107977 A1    Apr. 20, 2017

(30) Foreign Application Priority Data
Mar. 28, 2014    (DK) .................................. 2014 70160

(51) Int. Cl.
*F03D 80/80*    (2016.01)
*F03D 13/25*    (2016.01)
(Continued)

(52) U.S. Cl.
CPC ............. *F03D 80/82* (2016.05); *E04H 12/00* (2013.01); *F03D 13/10* (2016.05); *F03D 13/20* (2016.05);
(Continued)

(58) Field of Classification Search
CPC .......... F03D 13/10; F03D 13/40; F03D 80/82; F05B 2230/60; F05B 2240/95; F05B 2260/964; F05B 2240/912
(Continued)

(56) References Cited

U.S. PATENT DOCUMENTS 9,487,960 B2 * 11/2016 Kent .......................... E04G 3/20
2013/0115054 A1 * 5/2013 Yokoyama .............. F03D 13/10
                                                              415/126
(Continued)

FOREIGN PATENT DOCUMENTS

CN        101318542 A      12/2008
DE    202010007565 U1       9/2010
(Continued)

OTHER PUBLICATIONS

International Searching Authority, Search Report and Written Opinion Issued in Corresponding International Application No. PCT/DK2015/050060, dated Jun. 16, 2015.
(Continued)

*Primary Examiner* — Brian E Glessner
*Assistant Examiner* — Adam G Barlow
(74) *Attorney, Agent, or Firm* — Wood Herron & Evans LLP

(57) ABSTRACT

The invention relates to a method for installation of a power control module in a tower for a wind turbine. The method includes, providing a power control module (101) and providing a tower section (201). According to the invention the following steps are included in the mentioned sequence.
(Continued)

a) providing a temporary support device (301), b) placing the power control module (101) on the temporary support device (301), c) placing the tower section (201) around the power control module (101), d) connecting the power control module (101) to the tower section (201), and e) removing the connected power control module (101) and tower section (201) from the temporary support device (301). The invention also relates to an aggregate component for a wind turbine. The component includes a power control module (101) and a tower section (201). The power control module (101) is connected to and supported by the tower section (201) in a state as a pre-fabricated and mobile component. According to the invention the power control module (101) hangs suspended in the tower section (201).

18 Claims, 4 Drawing Sheets

(51) Int. Cl.
*F03D 13/40* (2016.01)
*F03D 13/20* (2016.01)
*F03D 13/10* (2016.01)
*E04H 12/00* (2006.01)

(52) U.S. Cl.
CPC ............. *F03D 13/25* (2016.05); *F03D 13/40* (2016.05); *F03D 80/80* (2016.05); *F05B 2230/60* (2013.01); *F05B 2240/912* (2013.01); *F05B 2240/95* (2013.01); *F05B 2260/964* (2013.01); *Y02E 10/727* (2013.01); *Y02E 10/728* (2013.01); *Y02P 70/523* (2015.11)

(58) Field of Classification Search
USPC .............................. 52/173.1, 745.17, 745.18
See application file for complete search history.

(56) References Cited

U.S. PATENT DOCUMENTS

| | | | |
|---|---|---|---|
| 2014/0147272 A1* | 5/2014 | Donescu | F03D 11/045 416/1 |
| 2015/0198148 A1* | 7/2015 | Mello | F03D 11/045 416/244 R |

FOREIGN PATENT DOCUMENTS

| | | | | |
|---|---|---|---|---|
| DE | 102010053360 A1 | 6/2012 | | |
| EP | 1788242 A1 | 5/2007 | | |
| EP | 2093417 A2 | 8/2009 | | |
| EP | 2108816 A2 | 10/2009 | | |
| EP | 2187050 A2 | 5/2010 | | |
| EP | 2280168 A2 | 2/2011 | | |
| EP | 2631479 A2 | 8/2013 | | |
| WO | 2010103114 A1 | 9/2010 | | |
| WO | WO-2010103114 A1 * | 9/2010 | ............ | F03D 11/045 |
| WO | 2012130245 A2 | 10/2012 | | |

OTHER PUBLICATIONS

Danish Patent and Trademark Office, Search Report Issued in Application No. PA 2014 70160, dated Nov. 10, 2014.

\* cited by examiner

METHOD FOR INSTALLATION OF A POWER CONTROL MODULE IN A WIND POWER UNIT TOWER AND AN AGGREGATE COMPONENT

FIELD OF INVENTION

The present invention in a first aspect relates to a method for installation of a power control module (PCM) in a tower for a wind power unit, which method includes providing a power control module and providing a tower section.

In a second aspect, the invention relates to an aggregate component for a wind power unit, which component includes a power control module and a tower section, which power control module is connected to and supported by the tower section in a state as a pre-fabricated and mobile component.

BACKGROUND OF INVENTION

A wind turbine with horizontal axis includes the main components turbine blades, a nacelle on which the blades are mounted and in which the electric generator is housed, a tower, at the top of which the nacelle is mounted and power control module arranged at the bottom of the tower. Transportation of the components and the assembling of these are circumstantial due to the high weight and the large dimensions and represent a considerable part of the costs for erecting a wind turbine. It is therefore important to arrange for the transportation and installation to be as rational as possible. The general object of the present invention is to attain improvements in this respect, in particular with regards to the power control module and the tower and the relation between these components.

The power control module contains the equipment required for the control of the turbine and for transferring the generated current to an appropriate electric output for the grid. The PCM thus may include a transformer, a converter, internal power supply and other mechanical and electrical accessories as well as a structural framework including platforms. The PCM may be divided into compartments arranged above each other, e.g. three compartments. Typically the transformer may be located in the lowermost compartment, the converter in the intermediate compartment and other equipment and sub-system in the uppermost compartment.

Traditionally the PCM is mounted on a foundation at the erection site and then the tower is mounted around it or a section of the tower is mounted on the foundation and the PCM is lowered into the tower section. This in many cases is a troublesome and time-consuming procedure, in particular at off-shore applications and at other windy places which for obvious reasons often is chosen.

EP 1788242 discloses an example of this technique, where a tower section is attached to the foundation. The tower section has supports on which platforms are lowered down to rest on the support, and the equipment is arranged on the platforms. Another example is disclosed in EP 2280168. Further similar arrangements are disclosed in EP 2108816, WO 2010103114, WO 2012130245 and DE 102010053360. EP2093417 discloses a preassembling of electronic subsystems onto a tower section.

SUMMARY OF INVENTION

In the light of the above, the object of the present invention is to rationalize the transportation of the PCM and the tower as well as the assembly of these components to each other and to overcome the drawbacks related to the prior art in this respect.

This object is according to the first aspect of the invention achieved in that a method of the kind specified in the preamble of claim 1 includes the specific measures specified in the characterizing portion of claim 1. Thus a temporary support device is provided, followed by placing the power control module on the temporary support device, placing the tower section around the power control module, connecting the power control module to the tower section, and removing the connected power control module and tower section from the temporary support device.

Thereby the number of crane actions is reduced, the transportation of these components is more effective and volume saving since they are transported in assembled condition. Also the mounting at the erection site is simplified. This contributes to a more cost effective transport and assembling. By using a temporary support device when assembling the PCM and the tower section, the connection of these components is simplified, provides greater flexibility regarding how to connect the components to each other and is important with regards to reducing crane time.

It is to be understood that the assembly can be performed with a pre-mounted complete PCM as well as sequentially assemble the compartments of the PCM above each other.

According to a further preferred embodiment of the invented method, the placing of the PCM on the temporary support device, the placing of the tower section around the PCM and the removing of the connected PCM and tower section from the support device are performed by vertically moving the respective item.

This is the simplest and most effective way of performing these action and which easily can be made by a crane.

According to a further preferred embodiment, the method includes the further steps of moving the connected PCM and tower section to a vessel for transportation to an off-shore erection site and placing the connected PCM and tower section on an off-shore located foundation.

The advantages of the present invention are most pertinent for off-shore applications because the assembled PCM and tower section normally has such a size that the transportation advantages are related to transport on a vessel.

According to a further preferred embodiment, the connecting of the PCM to the tower section includes hanging the PCM in the tower section.

This in many cases provides good stability and security for the connection.

According to a further preferred embodiment, the hanging of the PCM is performed by at least three bars.

Using bars, i.e. rigid elements, for the hanging, results in good stability and precision. Preferably the number of bars are at least four. Preferably the bars are made of steel. Preferably they are connected to the platform of the uppermost compartment.

According to a further preferred embodiment, the bars are attached to an internal flange of the tower section.

This provides a secure and well defined support for the bars and is a constructional easy solution. Preferably the ends of the bars are bolts extending through holes in the flange. Preferably the flange is located at the top of the tower section for obtaining maximal stability.

According to an alternative preferred embodiment, an internal support means is attached on the tower section, and the PCM is placed to rest standing on the internal support. Also this alternative results in a connection that is stable and secure. The internal support means may be arranged to directly support only the platform of the lowermost compartment of the PCM, whereby the other compartments are supported via the lowermost compartment. The support means may consist of a plurality of consoles attached to the inner wall of the tower section.

According to a further preferred embodiment, the PCM is attached to the internal support means.

Thereby the PCM is fixed also laterally eliminating the risk for relative movement between the PCM and the tower section.

According to a further preferred embodiment, elastic means are mounted between the PCM and the tower section.

This arrangement prevents the PCM to knock against the tower section when the tower section is moving either during transport or in operation when the tower is moving/bending back and forth during different wind loadings. The elastic means are preferably mounted on the PCM. The elastic means are primarily of importance when the PCM is hanging, whereas when the PCM is resting on support means this problem in most cases is of minor kind.

According to a further preferred embodiment the elastic means includes a plurality of rubber elements.

This is an easy and reliable way of providing the elasticity.

According to a further preferred embodiment, at least some of the rubber elements are vulcanised to steel brackets.

Thereby the elastic means may be tuned to have an adequate relation between a certain rigidity and a certain elasticity. Preferably all the rubber elements are vulcanised to steel brackets.

The above described preferred embodiments are specified in the claims depending from claim 1.

According to the second aspect of the invention, the object is achieved in that an aggregate component of the kind specified in claim 12 includes the specific features specified in the characterizing portion of claim 12. Thus the PCM hangs suspended in the tower section.

According to preferred embodiments the aggregate component further includes one or more of the devices included in the invented method, in particular according to any of the preferred embodiments thereof.

The invented aggregate component and the preferred embodiments thereof have advantages corresponding to those of the invented method and the preferred embodiments thereof, and which advantages have been described above.

It is to be understood that further preferred embodiments of the invented method and the invented aggregate component may be constituted by any possible combination of the features in the preferred embodiments and with any possible combination of these features with features described in relation to the following presentation of examples.

DESCRIPTION OF EXAMPLES

Figure 1:
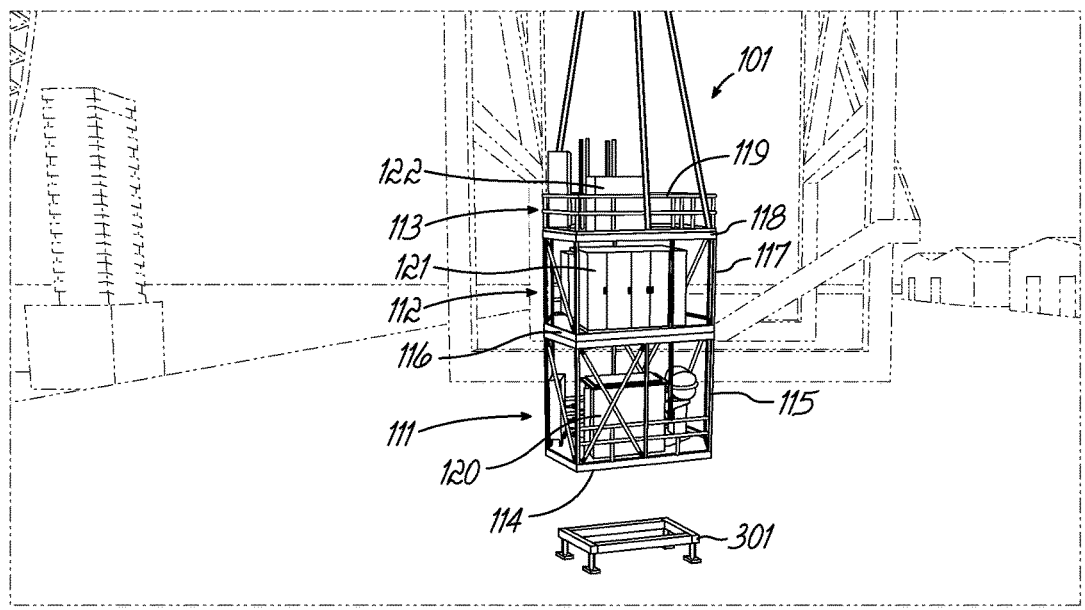
FIG. 1 illustrates a first step of the invented method according to a first example.

FIG. 1, like all the figures illustrating the first example of the invented method, Is a perspective view of the assembling in a port environment. A temporary support 301 is placed on the ground. The temporary support 301 is depicted as a simple stand having an upper square frame of steel beams with a leg in each corner.

A pre-assembled PCM 101 is hanging in the wires of a crane above the temporary support 301. The PCM consist of a first 111, a second 112 and a third 113 compartment. The first, lowermost compartment 111 has a bottom platform 114 and a framework of steel beams 115 extending upwards from the platform 114. Similarly the second, intermediate compartment 112 has a platform 116 at the bottom and a framework of beams 117. The third, uppermost compartment 113 has a bottom platform 118 and a surrounding fence 119. The beams 115 of the lowermost compartment 111 are attached to the platform 116 of the intermediate compartment 112, and the beams 117 of the intermediate compartment 112 are attached to the platform 118 of the uppermost compartment, such that the entire PCM 101 can be lifted by wires attached to the uppermost compartment 113.

The platform 114 of the lowermost compartment 111 supports a first group of equipment, e.g. including a transformer 120. The platform 116 of the intermediate compartment 112 supports a second group of equipment, including e.g. a converter 121. And the platform 118 of the uppermost compartment 113 supports a third group of equipment, including e.g. internal power supply system 122.

From the position illustrated in FIG. 1 the PCM 101 is by the crane lowered down to rest on the temporary support 301.

Figure 2:
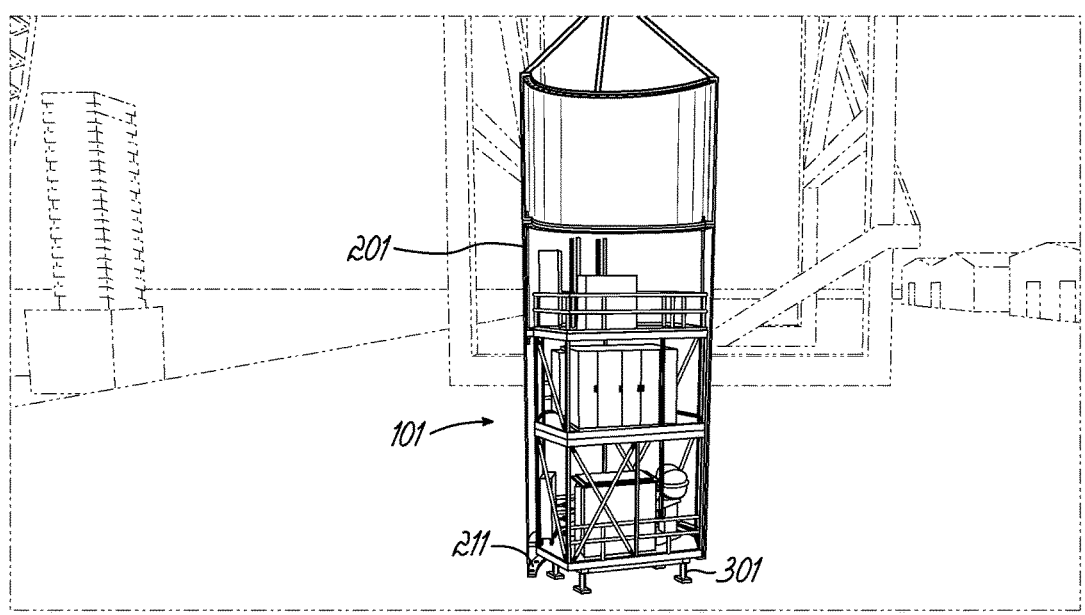
FIG. 2 illustrates a second step according to the first example.

In FIG. 2 the PCM 101 is shown resting on the temporary support 301. A tower section 201 is hanging in the crane and is lowered down around the PCM 101 until the bottom flange 211 of the tower section 201 is located slightly below the frame of the temporary support 301 or rests on the ground.

Figure 3:
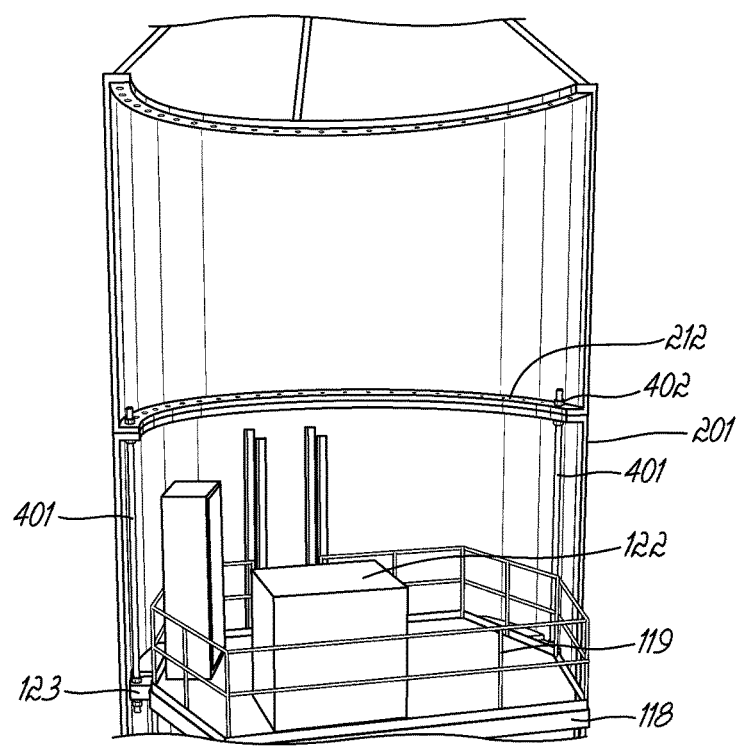
FIG. 3 illustrates a third step according to the first example.

FIG. 3 illustrates connection of the PCM 101 to the tower section 201. This is carried out by a number of suspension bars 401, in the illustrated example the number is four (of which only two are visible in the figure since only half of the tower section is shown). Each suspension bar 401 is attached at its upper end to the top flange 212 of the tower section 201. The upper end of each suspension beam 401 is threaded and attached to the flange 212 by means of nuts 402. The lower end of each suspension bar 401 is in a similar way attached to a flange 123 rigidly secured to the platform 118 of the uppermost compartment 113. The suspension bars are dimensioned to carry the weight of the entire PCM such that the PCM 101 can hung in the tower section by means of the suspension bars 401. Alternatively wires or the like may be used as suspension elements.

Figure 4:
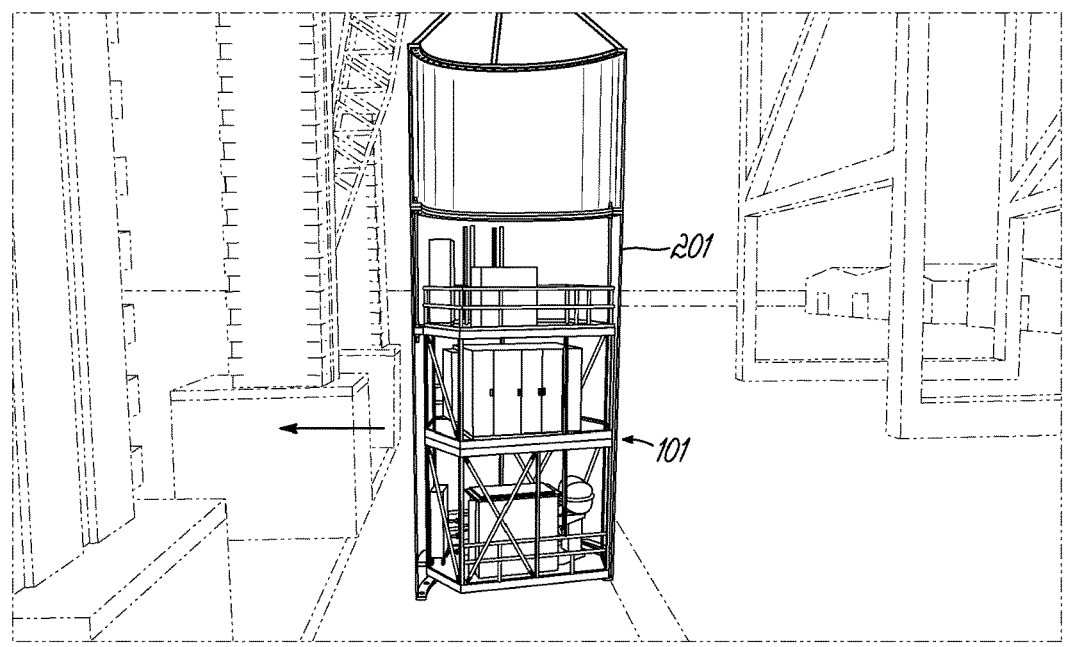
FIG. 4 illustrates a fourth step according to the first example.

When the connection illustrated in FIG. 3 is completed, the tower section 201 with the PCM 101 hanging therein is lifted by the crane and the temporary support is removed. As illustrated in FIG. 4 the aggregate component PCM 101 and tower section 201 is moved laterally by the crane to a vessel.

Figure 5:
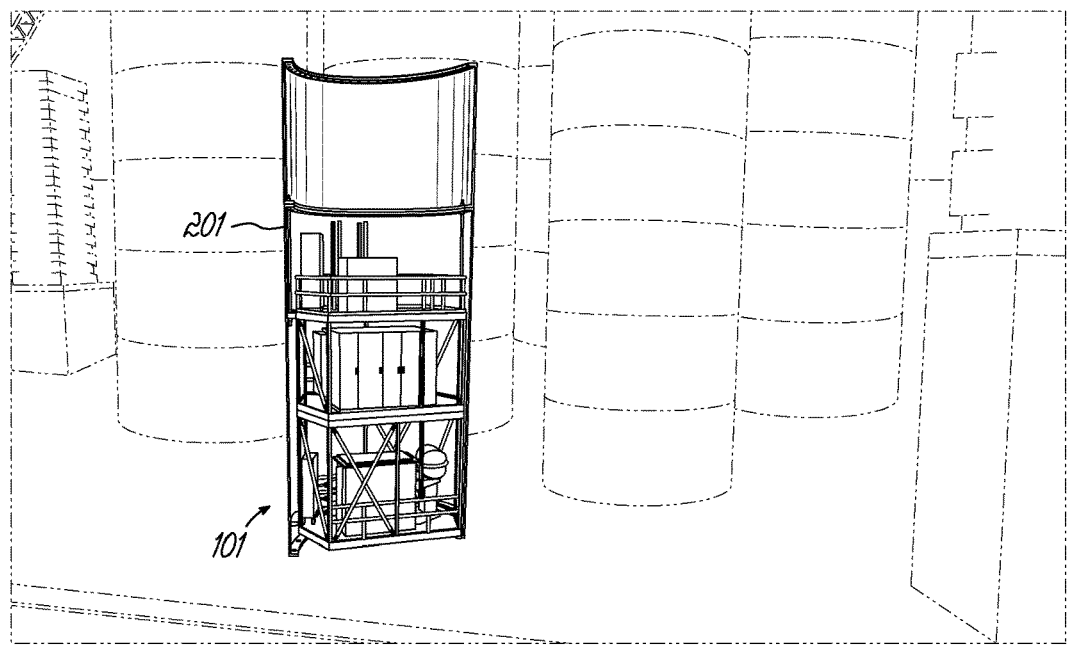
FIG. 5 illustrates a fifth step according to the first example.

FIG. 5 illustrates the aggregate component 101, 201 loaded on the vessel, by which it is transported to an off-shore erection site of the wind turbine.

Figure 6:
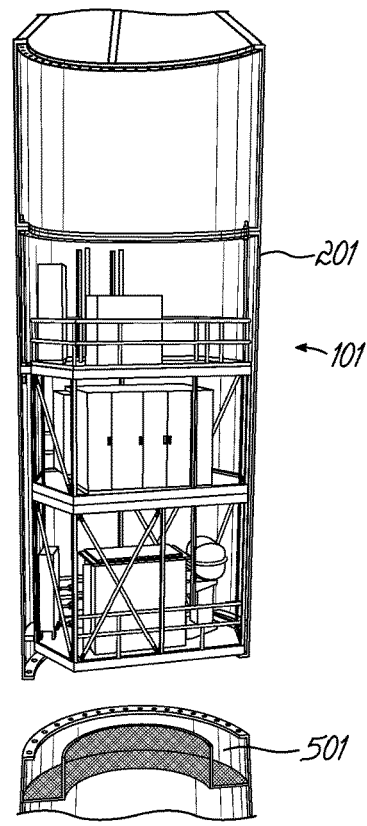
FIG. 6 illustrates a sixth step according to the first example.

When the vessel has reached the tower foundation at the erection site, the tower section 201 with the PCM 101 hanging therein is lifted from the vessel. The tower section 201 with the PCM is positioned aligned with the transition piece top flange 501 at the tower foundation and then lowered down to rest thereon as illustrated in FIG. 6.

Figure 7:
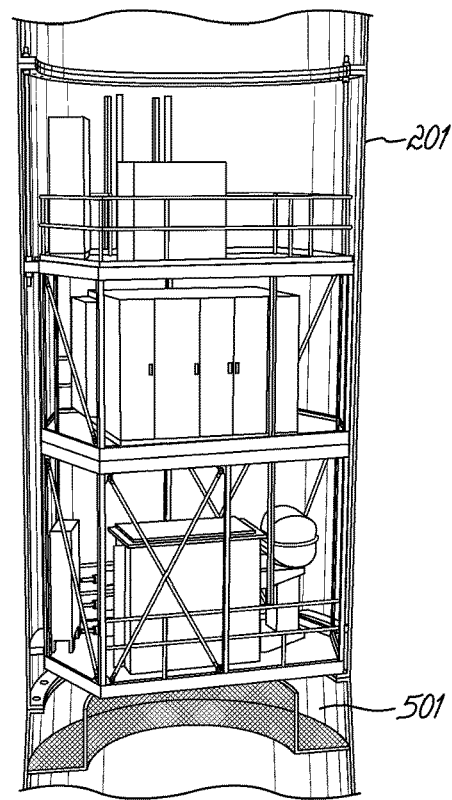
FIG. 7 illustrates a seventh step according to the first example.

FIG. 7 illustrates the tower section 201 secured to the foundation by bolting the tower section bottom flange 211 to the transition piece top flange 501.

Figure 8:
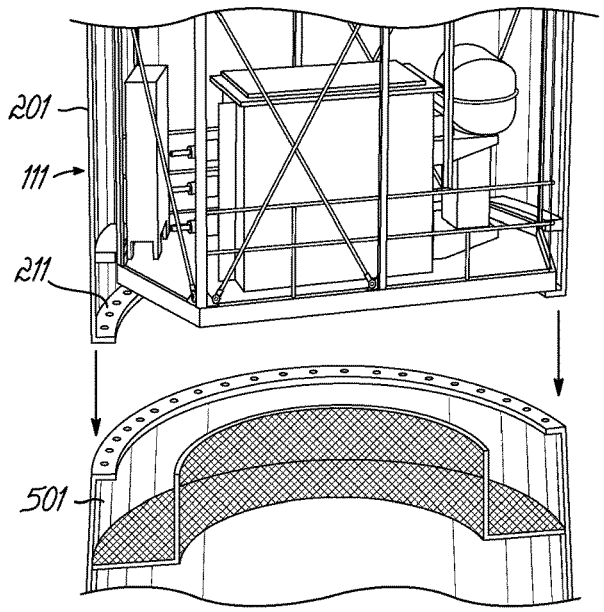
FIG. 8 illustrates the sixth step more in detail.
Figure 9:
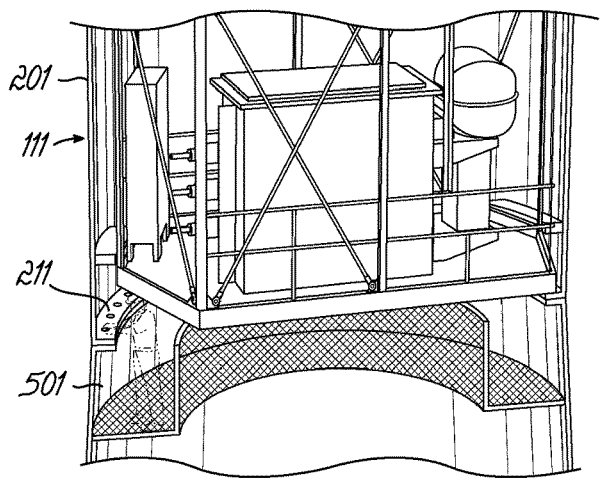
FIG. 9 illustrates the seventh step more in detail.

This is illustrated more in detail in FIGS. 8 and 9.

Figure 10:
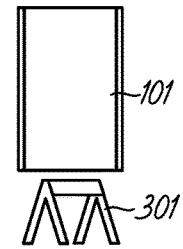
FIG. 10 illustrates a first step of the invented method according to a second example.
Figure 11:
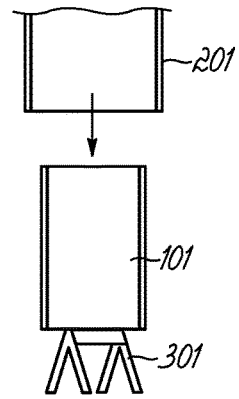
FIG. 11 illustrates a second step according to the second example
Figure 12:
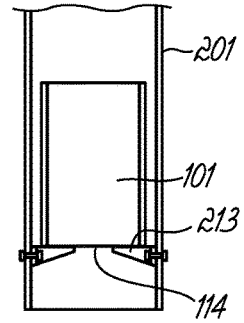
FIG. 12 illustrates a third step according to the second example.

In the above described example the PCM is supported by the tower section by hanging therein. An alternative example of the method is schematically illustrated in FIGS. 10 to 12. In this example the PCM does not hung from the tower but is resting on supports in the tower when assembled.

FIG. 10 illustrates the PCM 101 being lowered down to rest on the temporary support 301, and in FIG. 11 the tower section 201 is lowered down around the PCM 101. These steps thus are substantially similar to the corresponding steps in the first example.

When the tower section 201 is positioned around the PCM 101 a number of flange sections or consoles 213 are bolted to the inside wall of the tower section 201 at a level slightly below the underside of the bottom platform 114 of the lowermost PCM compartment. Thereafter the tower section 201 is raised until the consoles 213 abut the underside of the platform 114 as depicted in FIG. 12 such that the PCM 101 rests thereon.

Thereafter the lifting of the tower section 201 includes lifting of also the PCM 101 and the aggregate component can be loaded onto a vessel. The PCM may simply be resting on the consoles 213 or may be secured to these. The further steps are similar to those of the first example as described above.

Figure 13:
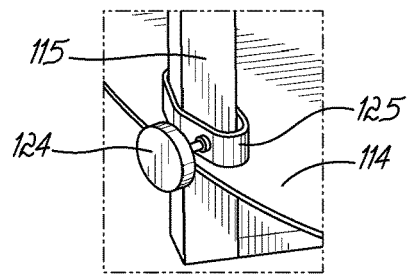
FIG. 13 in a perspective view illustrates a detail of the PCM according to an example of the invention.

FIG. 13 in a perspective view illustrates one of the vertical beams 115 at the corner of the lowermost compartment adjacent its platform 114. A rubber element 124 is vulcanised onto a steel bracket 125 attached to the beam 114. Such a rubber element is mounted at each corner of the compartment. Also the intermediate and the uppermost compartments may be provided with similar rubber elements. The purpose of these is to avoid that the PCM knocks against the inner wall of the tower section, in case the latter tend to deviate from its vertical position.

Generally the overall cross-sectional shape of the PCM may occupy less than the internal cross section shape of the tower section to provide passage on either side of the PCM for personnel and/or equipment to pass there through, either by a lift or on a ladder. Each platform may have an opening through which the maximum size component can pass through.

The invention claimed is:

1. A method for installation of a power control module in a tower for a wind turbine, comprising:
   providing a power control module,
   providing a tower section,
   wherein the method further comprises:
   a) providing a temporary support device,
   b) placing the power control module on the temporary support device,
   c) placing the tower section around the power control module,
   d) connecting the power control module to the tower section, and
   e) removing the connected power control module and tower section from the temporary support device,
   wherein steps a-e are carried out in the mentioned sequence.

2. The method according to claim 1, further comprising performing the steps b, c and e by vertically moving the respective item.

3. The method according to claim 1, further comprising the further steps of:
   f) moving the connected power control module and tower section to a vessel for transportation to an off-shore erection site, and
   g) placing the connected power control module and tower section on an off-shore located foundation.

4. The method according to claim 1, wherein step d includes hanging the power control module suspended in the tower section.

5. The method according to claim 4, further comprising hanging the power control module suspended in at least three bars.

6. The method according to claim 5, further comprising attaching the bars to an internal flange of the tower section.

7. The method according to claim 1, wherein step d includes attaching an internal support on the tower section, and placing the power control module to stand resting on the internal support.

8. The method according to claim 7, further comprising attaching the power control module to the internal support.

9. The method according to claim 1, further comprising the further step of mounting an elastic member between the power control module and the tower section.

10. The method according to claim 9, wherein the elastic means includes a plurality of rubber elements.

11. The method according to claim 10, wherein at least some of the rubber elements are vulcanised to steel brackets.

12. An aggregate component for a wind turbine, which component includes a power control module and a tower section, which power control module is connected to and supported by the tower section in a state as a pre-fabricated and mobile component wherein the power control module hangs suspended in the tower section;
   wherein the power control module includes a first compartment, the first compartment including a first platform and a first framework of rigid beams extending upwards from the first platform; and
   wherein the power control module includes a second compartment, the second compartment including a second platform and a second framework of rigid beams extending upwards from the second platform.

13. The aggregate component according to claim 12, wherein the component further includes one or more temporary support.

14. The aggregate component according to claim 12, wherein the power control module hangs suspended in the tower section using at least three bars attached to an internal flange of the tower section.

15. The aggregate component according to claim 12, wherein the power control module includes equipment for control of the wind turbine and for transferring generated current to an appropriate electric output for a power grid.

16. The aggregate component according to claim 12, wherein the power control module includes a transformer, a converter, and an internal power supply system.

17. The aggregate component according to claim 12, wherein the power control module includes a third compartment, the third compartment including a third platform and a surrounding fence.

18. The aggregate component according to claim 17, wherein the first framework of rigid beams of the first compartment is attached to the first platform of the second compartment, wherein the second framework of rigid beams of the second compartment is attached to the third platform of the third compartment, and wherein the entire power control module is configured to be lifted by wires attached to the third compartment.

* * * * *